UNITED STATES PATENT OFFICE.

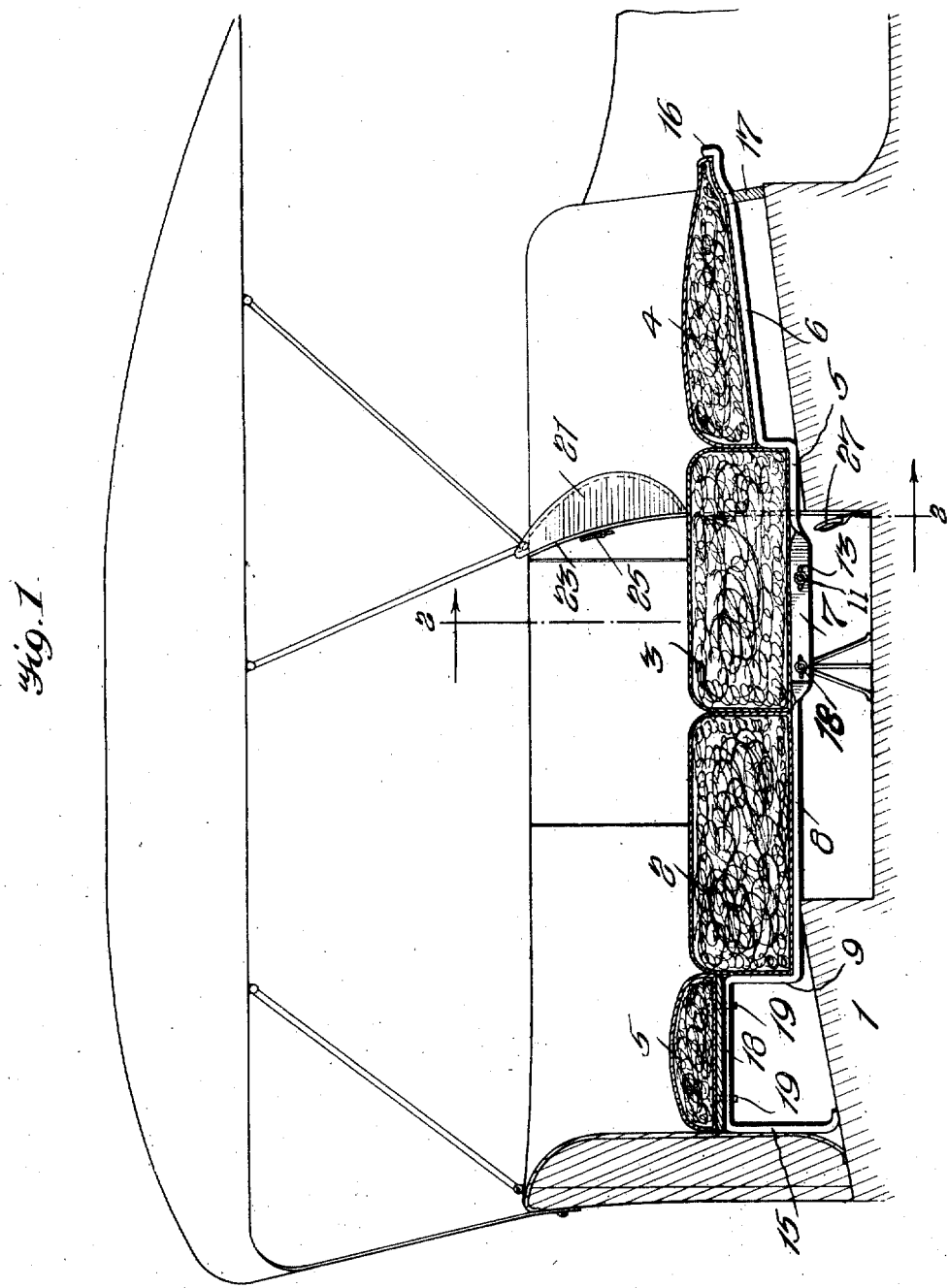

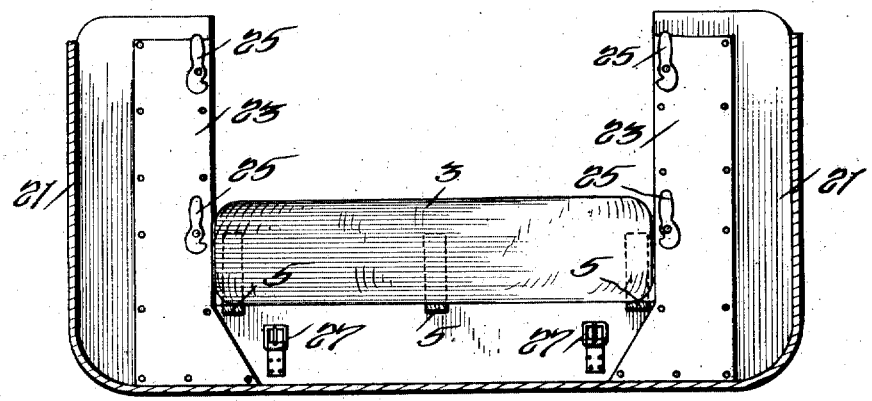
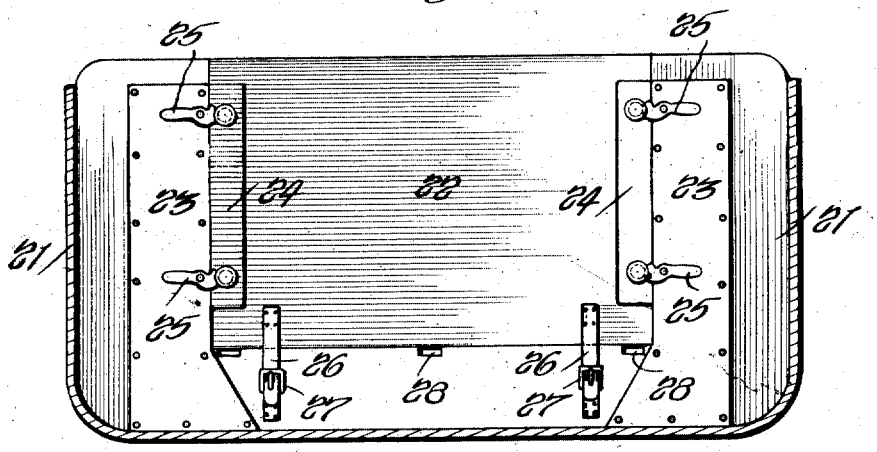
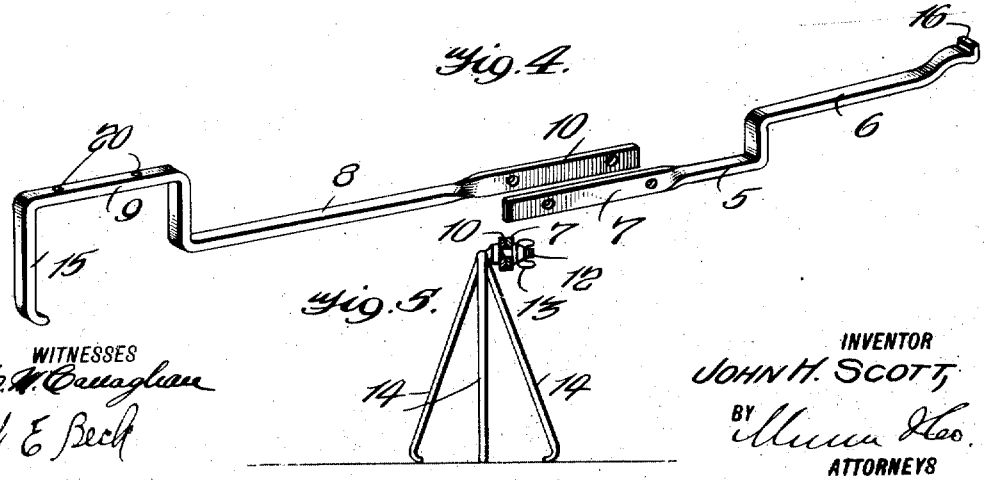

JOHN HENRY SCOTT, OF PORTLAND, OREGON.

AUTOMOBILE-SEAT.

1,253,432.  Specification of Letters Patent.  Patented Jan. 15, 1918.

Application filed March 1, 1917. Serial No. 151,757.

*To all whom it may concern:*

Be it known that I, JOHN H. SCOTT, a citizen of the United States, and a resident of Portland, in the county of Multnomah and State of Oregon, have invented certain new and useful Improvements in Automobile-Seats, of which the following is a specification.

My invention is an improvement in automobile seats, and has for its object to provide mechanism for use in connection with an automobile, to permit the cushions of the seats to be converted into a mattress.

In the drawings:

Figure 1 is a longitudinal vertical section through an automobile with the cushions converted into a bed, Fig. 2 is a section on the line 2—2 of Fig. 1, looking in the direction of the arrows adjacent to the line, with the mattress assembled, Fig. 3 is a similar view with the mattress removed, Fig. 4 is a perspective view of one of the supporting bars, and Fig. 5 is a rear view of the tripod.

The present embodiment of the invention is shown in connection with the body 1 of an automobile, the bed being composed of the rear seat cushion 2, the front seat cushion 3, the front back cushions 4, and an auxiliary cushion 5, which forms a pillow. The cushions are supported by sectional holding bars, three in number in the present instance, which are arranged longitudinally of the body, and which rest upon the rear seat, the front seat, and on a tripod to be later described. Each of the said supporting bars consists of a front section and a rear section. Each of the front sections consists of portions 5 and 6 which are offset with respect to each other, and the portion 5 is given a quarter turn at its rear end, as indicated at 7, in order that it may lap upon a similarly turned portion of the rear section. The rear section consists of portions 8 and 9 offset with respect to each other, the portion 8 having its front end given a quarter turn, as indicated at 10, to lap upon the portion 7 of the front section, and these portions 7 and 10 are provided with registering openings, as shown for receiving bolts 11 and 12 respectively for connecting the sections together, each bolt being engaged by a winged nut 13, as shown.

The bolt 12 is at the upper end of a tripod 14 and is rigid with the tripod. The portion 9 of the rear section is provided with a depending leg 15, which rests upon the rear seat, as shown in Fig. 1, to support the rear end of the supporting bar. The front end of the portion 5 of the front section rests upon the front seat, as shown, and the portion 6 is inclined upwardly, slightly, with respect to the portion 5. At its front end this portion 6 is provided with an upwardly extending lug 16 for engaging the front edge of the cushion 4 to prevent displacement of the same. Preferably the front ends of the supporting bars are supported by a cross plate 17 of wood or the like, and of suitable width, the lower edge of the plate resting upon the seat at the front thereof, while the upper engages the supporting bars. The cushion 5, which is a pillow, is connected with a plate 18 of suitable width and length, and the plate 18 is provided with a pair of bolts 19 at each supporting bar for loosely engaging openings 20 in the portions 9 of the supporting bars to prevent displacement of the pillow cushion.

In order that the mattress may be assembled, it is necessary to cut out a portion of the back 21 of the front seat. A portion indicated at 22 of the said seat, is cut away to permit it to be detached, and at the ends of the cut away portions, the back is reinforced by metal plates 23 which may be secured to the back in any suitable or desired manner. The cut away portion 22 is also reinforced at its ends by metal plates 24, and latches indicated at 25 are provided at the ends of the cut away portion to permit the said cut away portion to be held in place or detached and removed, as may be desired.

Each of these latches, as shown, consists of a lever which is pivoted to the reinforcing plate 23, and a catch which is arranged on the plate 24. The levers have eccentric portions which engage beneath the catches to tightly clamp the portion 22 in place. This portion is prevented from upward movement by means of straps 26 which are secured to the portion 22 and which engage buckles 27 on the back. To remove the cut away portion of the back, it is only necessary to release the straps 26 and to swing the levers 25 in the position of Fig. 2. The portion 22 may now be removed. It will be noticed from an inspection of Figs. 2 and 3, that at the bottom of the cut away portion, the back is provided with notches 28 for receiving the portions 5 of the supporting bars.

It will be observed from an inspection of Fig. 1 that the thick cushions 2 and 3 are arranged in such position that these cushions will be beneath the shoulders and hips of the occupant, making the mattress soft where the greatest weight is. The entire weight of the bars and plates 17 and 18 need not be greater than twenty-five pounds, and all can be stored beneath the rear seat, the sections of the supporting bars being detached. The mattress being arranged on the seats will give a maximum clearance between the mattress and the top of the car.

I claim:

1. In combination with a motor car, of means for converting the cushions thereof into a mattress, said car having a portion of the back of the front seat cut away, and having releasable means for holding the said cut away portion in place in the seat, of means for supporting the cushions of the vehicle with their upper surfaces in the same plane, said means comprising a series of supporting bars adapted to extend from the rear seat back to and beyond the front seat, and to rest upon the said seats, said bars being shaped to fit the under surface of the cushions and to hold said cushions with their upper surfaces in the same plane, each bar having at its rear end an upwardly offset portion provided with a depending leg, said upwardly offset portions having openings, a plate provided with a pillow and having depending pins for engaging the openings, said upwardly offset portions supporting the pillow with its upper surface above the general level of the cushions, each of the supporting bars being sectional and consisting of a front and a rear section, and a tripod arranged beneath each bar at the junction of the sections.

2. In combination with a motor car, of means for converting the cushions thereof into a mattress, said car having a portion of the back of the front seat cut away and having releasable means for holding the said cut away portion in place in the seat, of means for supporting the cushions of the vehicle with their upper surfaces in the same plane, said means comprising a series of supporting bars adapted to extend from the rear seat back to and beyond the front seat, and to rest upon the said seats, said bars being shaped to fit the under surface of the cushions and to hold said cushions with their upper surfaces in the same plane, each bar having at its rear end an upwardly offset portion provided with a depending leg, said upwardly offset portions having openings, a plate provided with a pillow and having depending pins for engaging the openings, said upwardly offset portions supporting the pillow with its upper surface above the general level of the cushions, each of the supporting bars being sectional and consisting of a front and a rear section.

3. In combination with a motor car, of means for converting the cushions thereof into a mattress, said car having a portion of the back of the front seat cut away and having releasable means for holding the said cut away portion in place in the seat, of means for supporting the cushions of the vehicle with their upper surfaces in the same plane, said means comprising a series of supporting bars adapted to extend from the rear seat back to and beyond the front seat, and to rest upon the said seats, said bars being shaped to fit the under surface of the cushions and to hold said cushions with their upper surfaces in the same plane, each bar having at its rear end an upwardly offset portion provided with a depending leg, said upwardly offset portions having openings, a plate provided with a pillow and having depending pins for engaging the openings, said upwardly offset portions supporting the pillow with its upper surface above the general level of the cushions.

JOHN HENRY SCOTT.

Witnesses:
ALFRED H. DAVIES,
WM. T. NELSON.

Copies of this patent may be obtained for five cents each, by addressing the "Commissioner of Patents, Washington, D. C."